US008901789B2

(12) United States Patent
Zook

(10) Patent No.: US 8,901,789 B2
(45) Date of Patent: Dec. 2, 2014

(54) ELECTRIC MACHINE MODULE

(75) Inventor: Chad Zook, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 462 days.

(21) Appl. No.: 13/269,224

(22) Filed: Oct. 7, 2011

(65) Prior Publication Data
US 2013/0088102 A1 Apr. 11, 2013

(51) Int. Cl.
H02K 9/20 (2006.01)
H02K 9/00 (2006.01)
H02K 21/12 (2006.01)
H02K 5/20 (2006.01)
H02K 9/19 (2006.01)

(52) U.S. Cl.
CPC ... *H02K 5/20* (2013.01); *H02K 9/19* (2013.01)
USPC ...... 310/54; 310/58; 310/156.66; 310/156.69

(58) Field of Classification Search
CPC ............................... H02K 9/19; F16C 19/184
USPC .............. 310/54, 156.66, 156.69, 156.73, 58
See application file for complete search history.

(56) References Cited

U.S. PATENT DOCUMENTS

| | | | |
|---|---|---|---|
| 3,828,618 A | 8/1974 | Sharpe et al. | |
| 4,329,000 A * | 5/1982 | Keske | 384/464 |
| 5,081,382 A | 1/1992 | Collings et al. | |
| 5,160,864 A | 11/1992 | Saito | |
| 5,180,004 A | 1/1993 | Nguyen | |
| 5,207,121 A | 5/1993 | Bien | |
| 5,372,213 A | 12/1994 | Hasebe et al. | |
| 5,965,965 A | 10/1999 | Umeda et al. | |
| 6,011,332 A | 1/2000 | Umeda et al. | |
| 6,069,424 A | 5/2000 | Colello et al. | |
| 6,097,130 A | 8/2000 | Umeda et al. | |
| 6,147,430 A | 11/2000 | Kusase et al. | |
| 6,147,432 A | 11/2000 | Kusase et al. | |
| 6,173,758 B1 | 1/2001 | Ward et al. | |
| 6,181,043 B1 | 1/2001 | Kusase et al. | |
| 6,208,060 B1 | 3/2001 | Kusase et al. | |
| 6,232,687 B1 | 5/2001 | Hollenbeck et al. | |
| 6,242,836 B1 | 6/2001 | Ishida et al. | |
| 6,291,918 B1 | 9/2001 | Umeda et al. | |
| 6,313,559 B1 | 11/2001 | Kusase et al. | |
| 6,333,573 B1 | 12/2001 | Nakamura | |

(Continued)

FOREIGN PATENT DOCUMENTS

JP 09182351 A * 7/1997
JP 11027893 A * 1/1999

OTHER PUBLICATIONS

Machine Translation JP11027893 (1999).*

*Primary Examiner* — Tran Nguyen
*Assistant Examiner* — Jose Gonzalez Quinones
(74) *Attorney, Agent, or Firm* — Greenberg Traurig, LLP

(57) ABSTRACT

Embodiments of the invention provide an electric machine module including an electric machine positioned with a housing. The brushless electric machine includes a center axis of rotation and a support member coupled to the housing. The module also includes a cooling system, which includes an inlet disposed through a portion of the housing, a first channel positioned within the support member that fluidly connects a second channel with the inlet. The housing also includes a drain aperture and a drain guide disposed substantially adjacent to the drain aperture.

18 Claims, 13 Drawing Sheets

(56) References Cited

U.S. PATENT DOCUMENTS

| | | |
|---|---|---|
| 6,335,583 B1 | 1/2002 | Kusase et al. |
| 6,346,758 B1 | 2/2002 | Nakamura |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,515,392 B2 | 2/2003 | Ooiwa |
| 6,522,043 B2 | 2/2003 | Measegi |
| 6,559,572 B2 | 5/2003 | Nakamura |
| 6,579,202 B2 | 6/2003 | El-Antably et al. |
| 6,770,999 B2 | 8/2004 | Sakuraki |
| 6,897,594 B2 | 5/2005 | Ichikawa et al. |
| 6,998,749 B2 | 2/2006 | Wada et al. |
| 7,002,267 B2 | 2/2006 | Raszkowski et al. |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,615,903 B2 | 11/2009 | Holmes et al. |
| 7,615,951 B2 | 11/2009 | Son et al. |
| 7,667,359 B2 | 2/2010 | Lee et al. |
| 7,759,838 B2 | 7/2010 | Bradfield et al. |
| 7,911,108 B2 | 3/2011 | Hayasji |
| 2004/0036367 A1 | 2/2004 | Denton et al. |
| 2006/0170298 A1* | 8/2006 | Edrington ............ 310/90 |
| 2008/0098768 A1* | 5/2008 | Masoudipour et al. ...... 62/505 |
| 2009/0107755 A1 | 4/2009 | Kothari et al. |
| 2010/0320851 A1 | 12/2010 | Lambka et al. |
| 2011/0084561 A1 | 4/2011 | Swales et al. |
| 2013/0015732 A1* | 1/2013 | Bradfield ............ 310/59 |

\* cited by examiner

ELECTRIC MACHINE MODULE

BACKGROUND

Some electric machines, such as alternators and other generators, are capable of generating an electric current, which can at least partially re-charge a battery and/or provide current to other electricity-requiring loads. Many of these electric machines produce quantities of electricity that are generally commensurate with the requirements of the structure into which the machines are installed. Some of these electric machines include a rotating rotor assembly at least partially positioned within a stator assembly. Some of these machines may require a brushed configuration because of the rotating machine components, which can impact power densities.

SUMMARY

Some embodiments of the invention provide an electric machine module including a housing. In some embodiments, the housing can include a sleeve member coupled to at least one end cap. In some embodiments, at least some portions of the housing can define a machine cavity. In some embodiments, an electric machine can be positioned within the machine cavity and at least partially enclosed by the housing. In some embodiments, the electric machine can comprise a brushless configuration and a central axis of rotation. In some embodiments, the machine can include a stationary support member coupled to a wall of the housing.

In some embodiments, the module can include a cooling system. The cooling system can include at least one inlet disposed through a portion of the housing and a first channel at least partially disposed within the support member and oriented substantially parallel to the central axis of rotation. In some embodiments, the first channel can be in fluid communication with the at least one inlet. In some embodiments, the cooling system can include at least one second channel disposed within the support member and oriented substantially perpendicular to the central axis of rotation. In some embodiments, the at least one second channel can be in fluid communication with the first channel and the machine cavity. In some embodiments, the housing can include at least one drain aperture. In some embodiments, the drain aperture can be disposed through a portion of the housing. In some embodiments, the housing can comprise at least one drain guide substantially immediately

DETAILED DESCRIPTION

Figure 1:
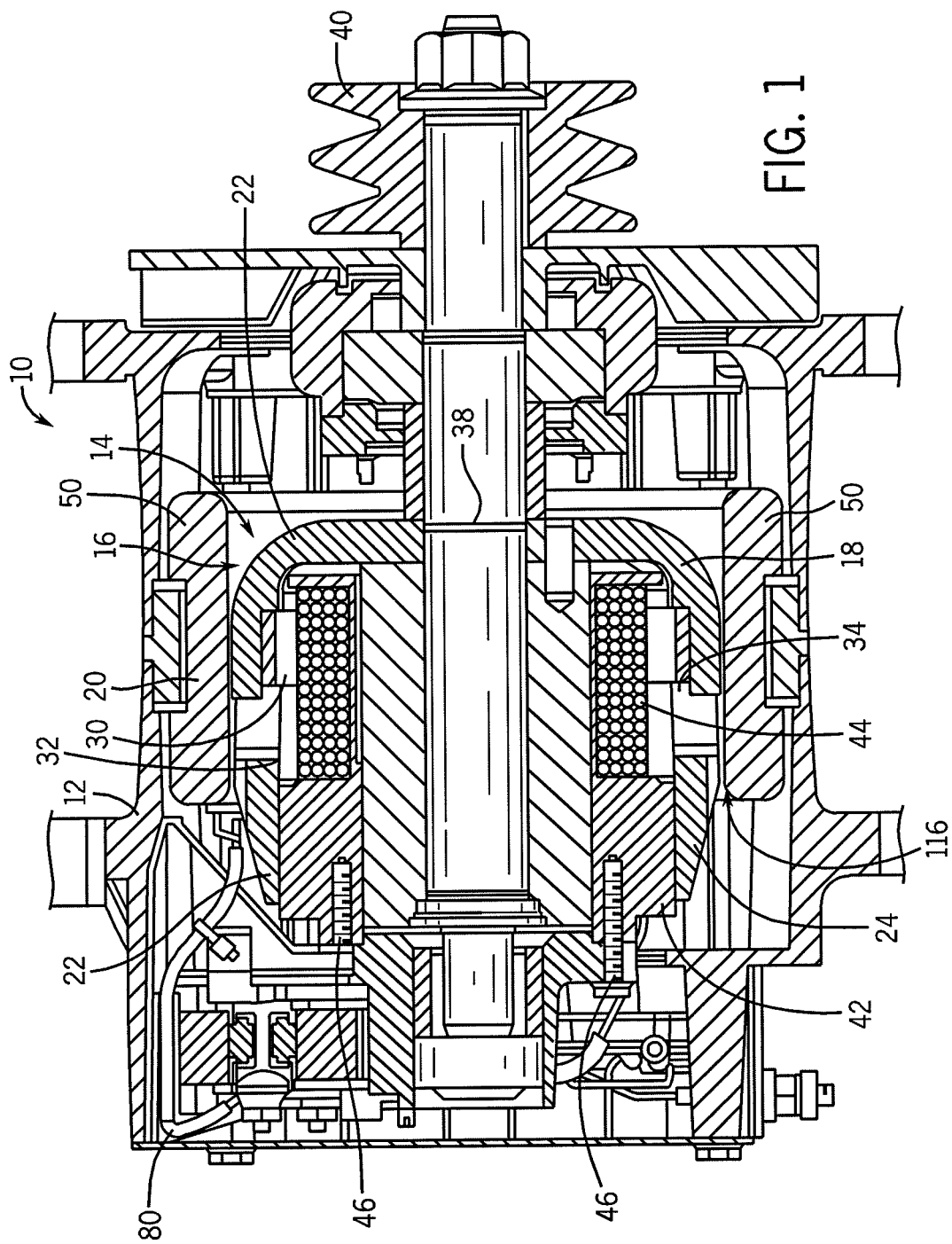
FIG. 1 is a cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 2:
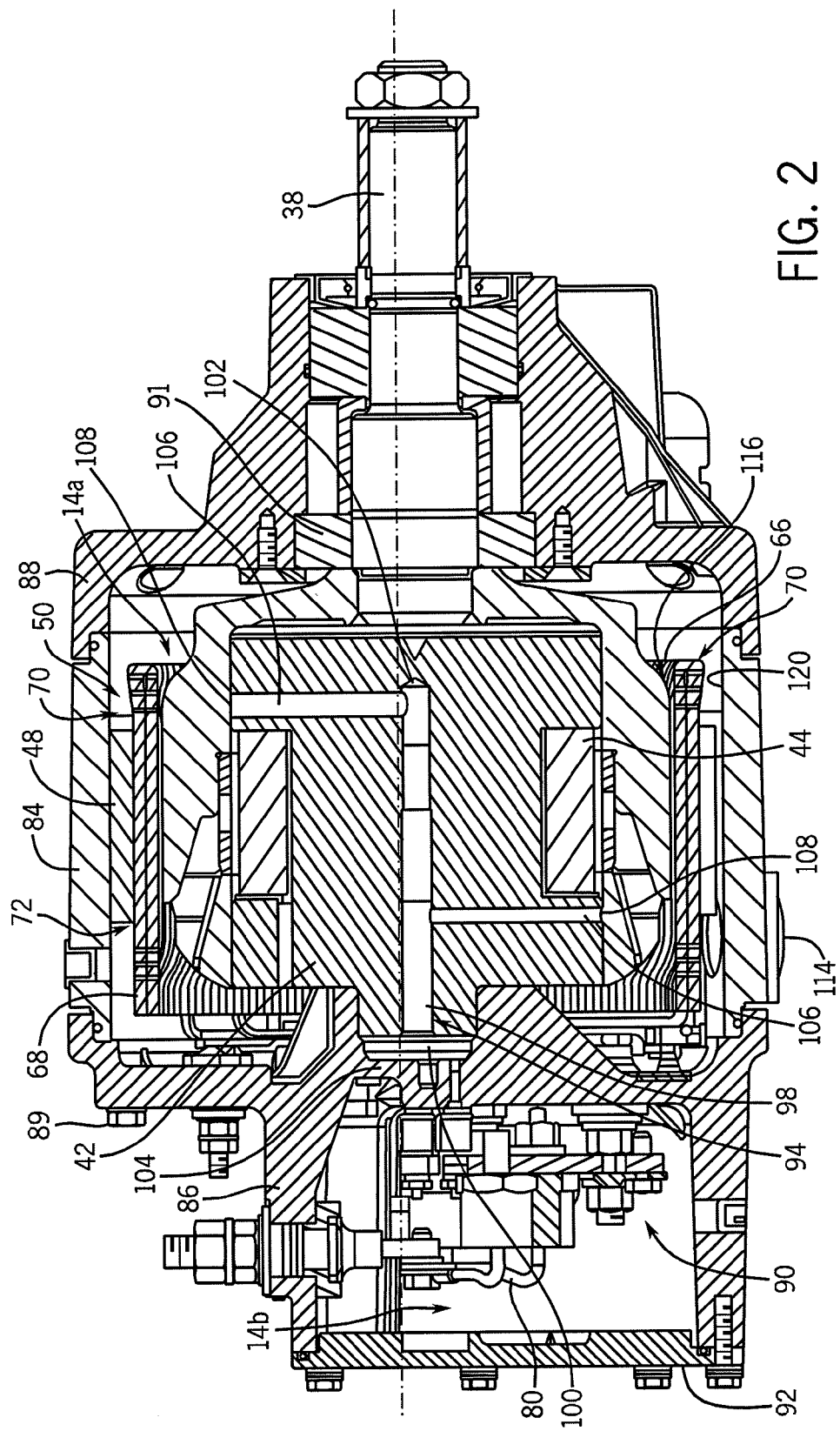
FIG. 2 is a cross-sectional view of an electric machine module according to one embodiment of the invention.

FIGS. 1 and 2 illustrate an electric machine module 10 according to one embodiment of the invention. The module 10 can include a housing 12, which can define at least a portion of a machine cavity 14. In some embodiments, an electric machine 16 can be housed within the machine cavity 14 and at least partially enclosed by the housing 12. In some embodiments, the housing 12 can comprise materials that can generally include thermally conductive properties, such as, but not limited to aluminum or other metals and materials capable of generally withstanding operating temperatures of the electric machine 16. In some embodiments, the housing 12 can be fabricated using different methods including casting, molding, extruding, and other similar manufacturing methods. In some embodiments, the electric machine 16 can be, without limitation, an electric motor, such as a hybrid electric motor, an electric generator, a vehicle alternator, and/or an induction belt-driven alternator-starter (BAS).

Figure 3:
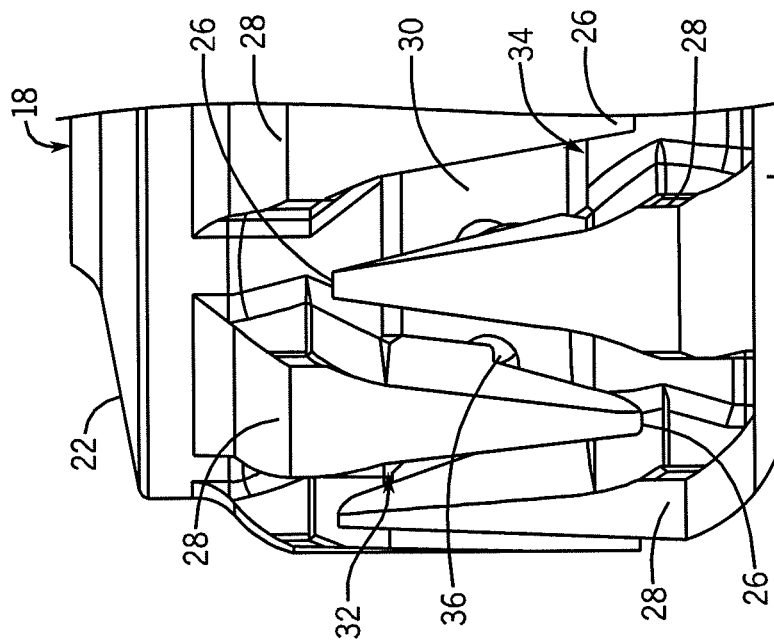
FIG. 3 is a partial view of a portion of a rotor assembly according to one embodiment of the invention.

In some embodiments, the electric machine 16 can include a rotor assembly 18 and a stator assembly 20. In some embodiments, the stator assembly 20 can circumscribe at least a portion of the rotor assembly 18. In some embodiments, the rotor assembly 18 can include at least two matingly-configured segments 22 coupled together. In some embodiments, the segments 22 can comprise a Lundell-type configuration. In some embodiments, the segments 22 can each include a plurality of claw poles 24 that are configured and arranged to matingly engage each other. For example, in some embodiments, at least a portion of the claw poles 24 can be configured and arranged so that during assembly, some of the claw poles 24 can axially integrate (e.g., matingly engage and/or interdigitate) so that a tip 26 of a claw pole 24 on one segment 22 is substantially adjacent to a base 28 of a claw pole 24 on the other segment 22, as shown in FIG. 3.

In some embodiments, during assembly of the module 10, the two segments 22 can be coupled together. In some embodiments, the coupling of the segments 22 can be at least partially performed by a ring member 30. In some embodiments, the segments 22 can be coupled to at least a portion of the ring member 30. For example, in some embodiments, the ring member 30 can comprise a first axial edge 32 and a second axial edge 34 and one of the segments 22 can be coupled to the ring member 30 substantially adjacent to the first axial edge 32 and the other segment 22 can be coupled to the ring member 30 substantially adjacent to the second axial edge 34. For example, in some embodiments, at least one of the segments 22 can be coupled to the ring member 30 using welding, brazing, adhesives, conventional fasteners, etc. As a result, in some embodiments, the segments 22 can be axially positioned with respect to the ring member 30 (i.e., the ring member 30 can be substantially centrally positioned with respect to the segments 22). In some embodiments, the ring member 30 can comprise a substantially magnetically inert material, such as stainless steel. Additionally, in some embodiments, the ring member 30 can comprise a plurality of apertures 36 positioned through portions of the ring member 30 in a substantially circumferential orientation.

In some embodiments, the electric machine 16 can comprise a shaft 38. In some embodiments, at least one of the segments 22 can be operatively coupled to the shaft 38. For example, in some embodiments, at least one of the segments 22 can be rotatably coupled to the shaft 38 so that rotation of the shaft 38 causes rotation of the rotor assembly 18 (e.g., the rotor assembly 18 and the shaft 38 can substantially synchronously rotate). Additionally, in some embodiments, the shaft 38 can be coupled to a pulley 40. In some embodiments, the pulley 40 can be coupled to an energy generation apparatus (not shown) to provide a force to rotate the pulley 40, which can be translated to rotation of the shaft 38 and the rotor assembly 18. By way of example only, in some embodiments, the pulley 40 can be coupled to an engine via a belt (not shown) so that belt movement can rotate the pulley 40.

Figure 4:
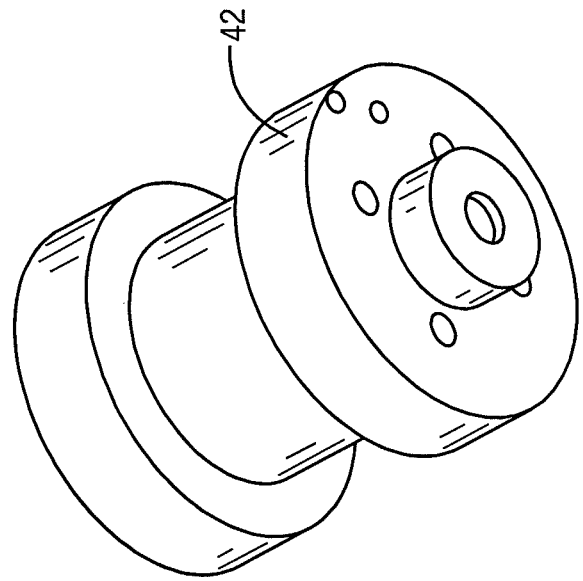
FIG. 4 is a perspective view of a support member according to one embodiment of the invention.

In some embodiments, the rotor assembly 18 can substantially circumscribe at least a portion of a support member 42 that can include a field coil 44. In some embodiments, the support member 42 can be coupled to a portion of the housing 12 so that during operation of the module 10, the support member 42 can remain substantially stationary. Moreover, in some embodiments, the support member 42 can be coupled to the housing 12 so that it axially extends into the machine cavity 14 and can be received by at least a portion of the rotor assembly 18. In some embodiments, the support member 42 can be coupled to the housing 12 using conventional fasteners 46, and in other embodiments, the support member 42 can be coupled to the housing 12 in other manners or the support member 42 can be substantially integral with the housing 12. Additionally, in some embodiments, the support member 42 can comprise a generally annular configuration, as shown in FIG. 4. In other embodiments, the support member 42 can comprise other configurations (e.g., square, rectangular, regular or irregular polygonal, etc.) that can be received within at least a portion of the rotor assembly 18.

In some embodiments, the field coil 44 can circumscribe at least a portion of the support member 42. In some embodiments, the field coil 44 can comprise at least one wire wound around at least a portion of an outer diameter of the support member 42. For example, in some embodiments, the field coil 44 can be wound around the support member 42 multiple times so that the field coil 44 comprises multiple layers in a generally radial orientation. In some embodiments, the field coil 44 can comprise a copper-containing material.

In some embodiments, the module 10 can comprise a brushless configuration. In some embodiments, the field coil 44 can be electrically connected to a current source (not shown). As a result, in some embodiments, a current can circulate from the current source to the field coil 44 for use in operations of the electric machine 20. In some embodiments, as result of the substantially stationary support member 42 and field coil 44, the module 10 can be brushless (e.g., no brushes and/or slip rings are necessary for circulating current through the field coil 44). Relative to some conventional electric machines, the brushless configuration can offer some benefits. By way of example only, the brushes of some conventional electric machines can experience heavy wear during machine operations, which can lead to frequent maintenance. In some embodiments of the invention, by including a stationary support member 42 and field coil 44 in a brushless configuration, the requirement for brush repair can be at least partially obviated. Additionally, as described in further detail below, the brushless configuration can at least partially enable improved electric machine 16 cooling, which can result in greater electric machine output (e.g. amperes).

Figure 5:
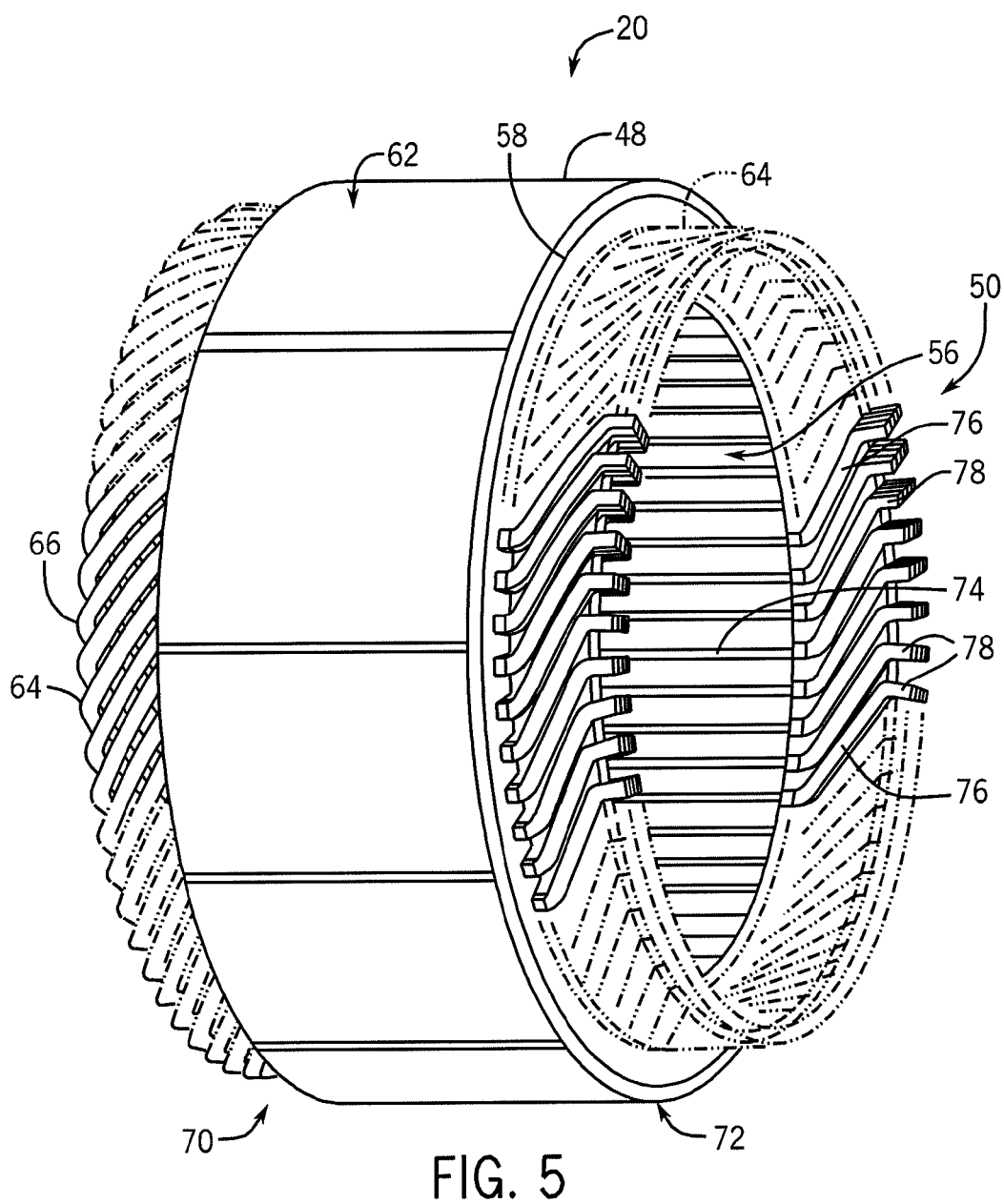
FIG. 5 is a perspective view of a stator assembly according to one embodiment of the invention.
Figure 6B:
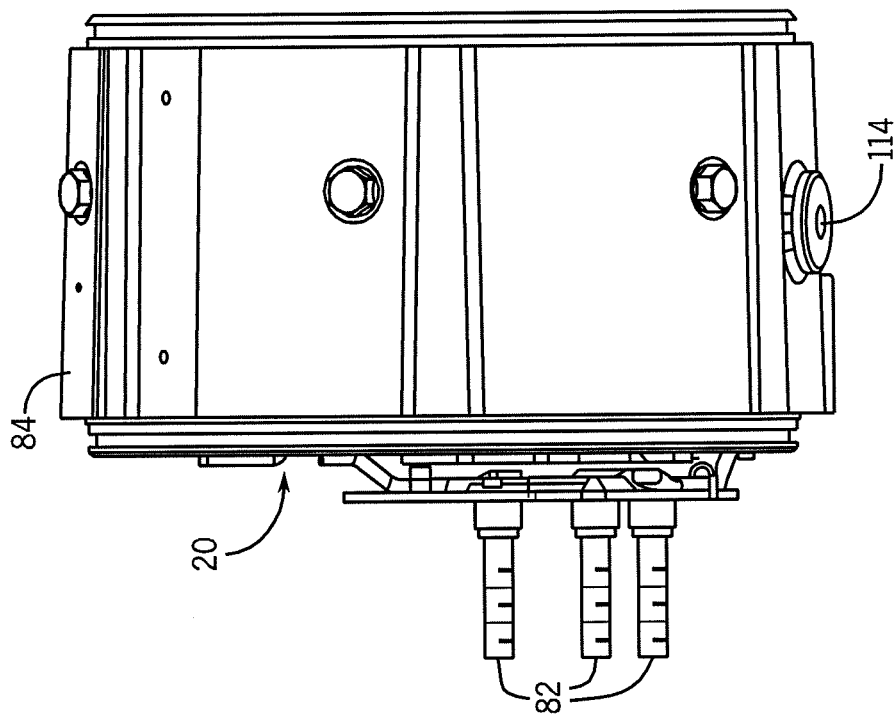
FIG. 6B is a side view of the stator assembly of FIG. 6A.
Figure 6A:
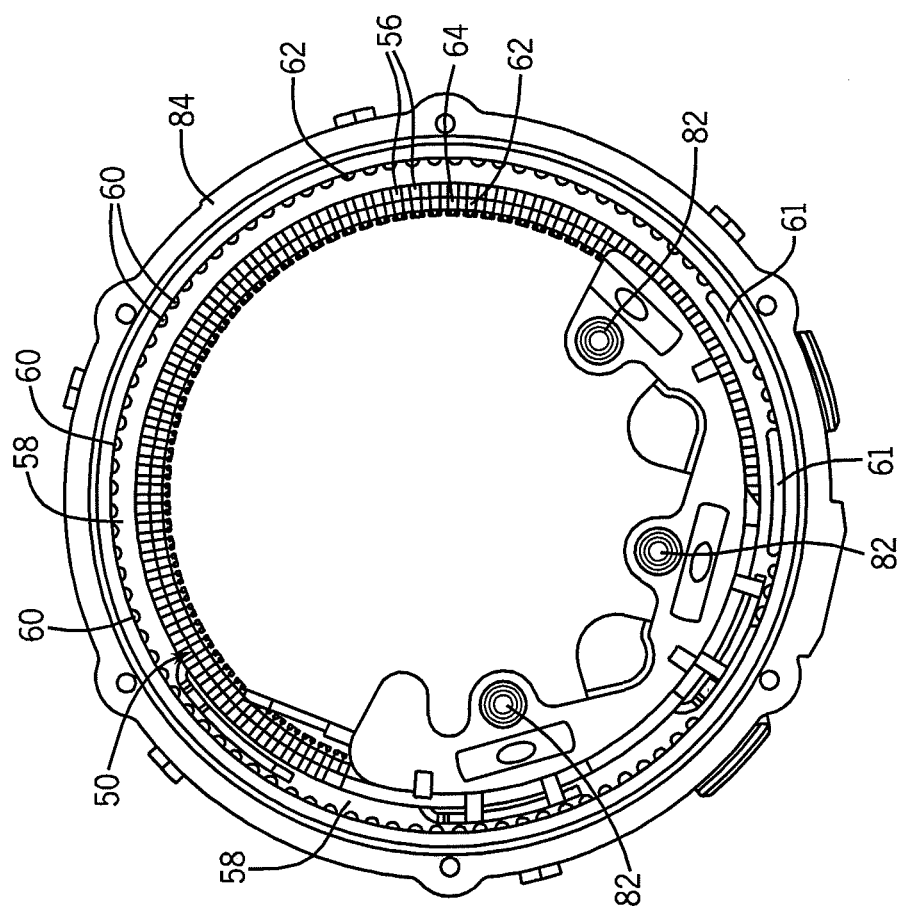
FIG. 6A is a top view of a stator assembly according to one embodiment of the invention.
Figure 7:
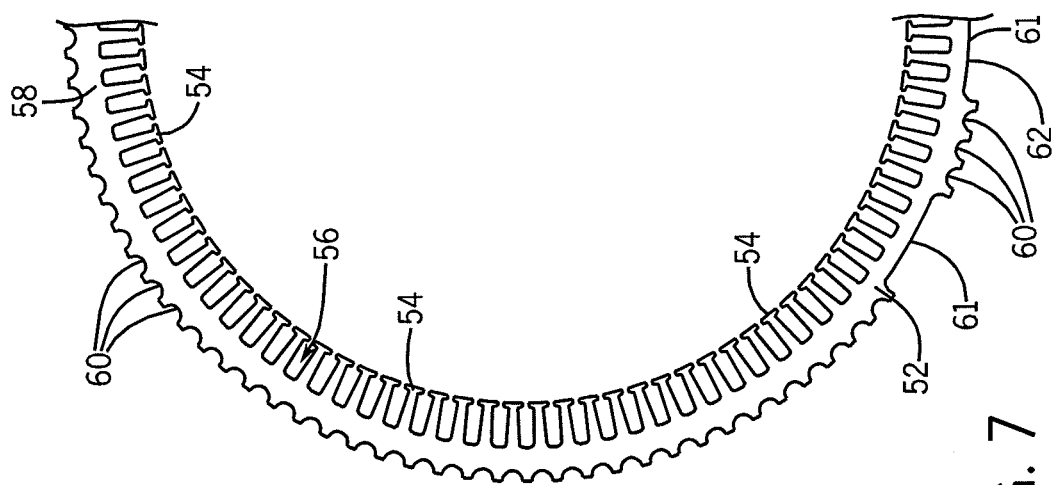
FIG. 7 is a partial view of a stator lamination according to one embodiment of the invention.

As shown in FIGS. 5 and 6, in some embodiments, the stator assembly 20 can comprise a stator core 48 and a stator winding 50 at least partially disposed within a portion of the stator core 48. For example, in some embodiments, the stator core 48 can comprise a plurality of laminations 52. Referring to FIG. 7, in some embodiments, the laminations 52 can comprise a plurality of substantially radially-oriented teeth 54. In some embodiments, as shown in FIGS. 5 and 6, when at least a portion of the plurality of laminations 52 are substantially assembled, the teeth 54 can substantially align to define a plurality of slots 56 that are configured and arranged to support at least a portion of the stator winding 50. As shown in FIGS. 5 and 6, in some embodiments, the laminations 52 can include multiple teeth 54, and, as a result, the stator core 48 can include multiple slots 56.

As shown in FIG. 7, in some embodiments, at least a portion of the laminations 52 can comprise a yoke 58. In some embodiments, the laminations 52 can be formed so that the yoke 58 is substantially radially outward from the teeth 54. Moreover, in some embodiments, at least some of the laminations 52 can comprise a plurality of scallops 60. In some embodiments, an outer diameter 62 of some of the laminations 52 can comprise the scallops 60. For example, in some embodiments, the scallops 60 can be positioned around at least a portion of a circumference of the laminations 52, as shown in FIG. 7. In some embodiments, the scallops 60 can all be substantially uniform in size, however, in other embodiments, the scallops 60 can vary in size (e.g., some scallops 60 can include a greater or lesser perimeter relative to other scallops 60). Additionally, although depicted in a generally semi-circular configuration, in some embodiments, the scallops 60 can comprise other shapes such as square, rectangular, regular or irregular polygonal, etc.

Additionally, in some embodiments, the outer diameter 62 can comprise at least one recess 61. In some embodiments, the laminations 52 can comprise a plurality of recesses 61. In some embodiments, the recesses 61 can be positioned in different locations around portions of the outer diameter 62. For example, a generally lower portion of the lamination 52 can comprise at least some recesses 61 to enable coolant flow, as detailed below. Moreover, in some embodiments, the generally upper portion of the lamination 52 can comprise at least one recess 61 to enable air movement within the machine cavity 14 to at least partially prevent formation of a vacuum during coolant drainage, as detailed below. Moreover, in some embodiments, the entire outer diameter 62 of each lamination 52 can comprise the scallops 60, although, in some embodiments, the recess 61 portion of the outer diameter 62 can substantially lack the scallops 60.

In some embodiments, the scallops 60 can at least partially improve electric machine 16 operations. For example, in some embodiments, the scallops 60 can at least partially lead to an increased surface area of the outer diameter of the stator core 48 when laminations 52 are coupled together. As a result, in some embodiments, at least a portion of the heat energy produced by the stator assembly 20 can be more easily transferred (e.g., conducted) to the housing 12 or transferred (e.g., convected) to the air in the machine cavity 14.

In some embodiments, the laminations 52 can comprise different compositions. In some embodiments, the laminations 52 can comprise a material that can at least partially minimize stator core losses. In some embodiments, at least a portion of the laminations 54 can comprise a silicon-steel composition. By way of example only, in some embodiments, the laminations 52 can comprise electrical grade steel, such as M36, M47, or another grade of steel. Compared to some conventional laminations, the composition used to create the laminations 52 can offer advantages. For example, some conventional laminations can comprise a generally low-grade carbon-containing composition, which can be slightly more cost effective, but, compared to some embodiments of the invention, can be at least partially less efficient and can lead to poorer performance by the electric machine 16. Additionally, in some embodiments, by including laminations 52 comprising the silicon-steel composition, stator core losses such as hysteresis and eddy currents can be minimized, which can at least partially correlate with increased efficiency and a generally greater output compared to some conventional electric machines.

Figure 8:
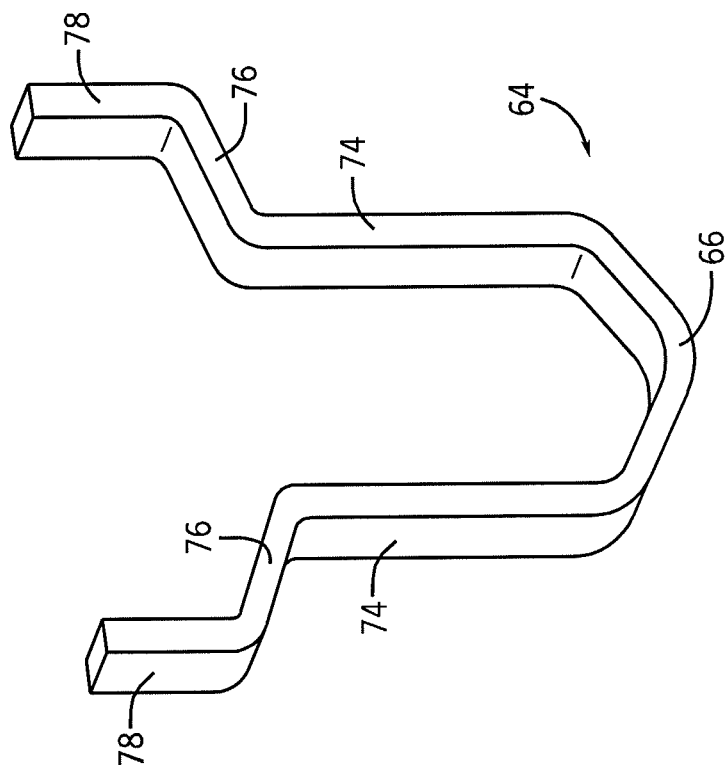
FIG. 8 is a perspective view of a conductor according to one embodiment of the invention.

In some embodiments, the stator winding 50 can comprise a plurality of conductors 64. In some embodiments, the conductors 64 can comprise a substantially segmented configuration (e.g., a hairpin configuration), as shown in FIG. 8. For example, in some embodiments, at least a portion of the conductors 64 can include a turn portion 66 and at least two leg portions 68. In some embodiments, the turn portion 66 can be disposed between the two leg portions 68 to substantially connect the two leg portions 68. In some embodiments, the leg portions 68 can be substantially parallel. Moreover, in some embodiments, the turn portion 66 can comprise a substantially "u-shaped" configuration, although, in some embodiments, the turn portion 66 can comprise a v-shape, a wave shape, a curved shape, and other shapes. Additionally, in some embodiments, as shown in FIG. 8, at least a portion of the conductors 64 can comprise a substantially rectangular cross section. In some embodiments, at least a portion of the conductors 64 can comprise other cross-sectional shapes, such as substantially circular, square, hemispherical, regular or irregular polygonal, etc.

Furthermore, in some embodiments, the cross-section of the conductors 64 can be substantially similar to the cross-section of the slots 56. For example, in some embodiments, the conductors 64 and the slots 56 can comprise a substantially rectangular cross section. As a result of the substantially similar cross sections, a slot fill percentage (e.g., a ratio of the cross-sectional area of the conductors to the cross-sectional area of the slots) can be at least partially increased. Accordingly, some embodiments of the invention can exhibit improved efficiency, increased output, and decreased conductor resistance relative to some conventional electric machines because those machines can include conductors and slots with substantially different cross-sections (e.g., conductors with a substantially circular cross-section in a slot with a substantially rectangular cross section), which can reduce slot fill percentage and lead to a decrease in performance.

In some embodiments, as shown in FIG. 5, at least a portion of the conductors 64 can be positioned substantially within the slots 56. For example, in some embodiments, the stator core 48 can be configured so that the plurality of slots 56 are substantially axially arranged. In some embodiments, the leg portions 68 can be inserted into the slots 56 so that at least some of the leg portions 68 can axially extend through the stator core 48. In some embodiments, the leg portions 68 can be inserted into neighboring slots 56. For example, in some embodiments, the leg portions 68 of a conductor 64 can be disposed in slots that are distanced approximately one magnetic-pole pitch apart (e.g., six slots, eight slots, etc.).

Moreover, in some embodiments, the stator winding 50 can comprise a distributed winding configuration. As discussed in further detail below, the stator winding 50 can comprise a plurality of phases. For example, in some embodiments, at least some of the slots 56 can include multiple phases. Moreover, in some embodiments, because the leg portions 68 of conductors are inserted into different slots 56 and each slot 56 can comprise multiple slots, operations of the electric machine 16 can be at least partially improved. For example, relative to some conventional electric machines that can include a concentrated winding, some of the magnetic noise produced as a result of electric machine operations can be at least partially reduced. Furthermore, torque ripple can also be reduced in some embodiments including a distributed winding configuration relative to a concentrated winding configuration. As a result of the reduction of some of the drawbacks associated with concentrated windings, some embodiments of the invention can produce an increased amount of output.

In some embodiments, a plurality of conductors 64 can be disposed in the stator core 48 so that at least some of the turn portions 66 of the conductors 64 axially extend from the stator core 48 at an insertion end 70 of the stator core 48 and at least some of the leg portions 68 axially extend from the stator core 48 at a weld end 72 of the stator core 48. In some embodiments, the conductors 64 can be fabricated from a substantially linear conductor 64 that can be configured and arranged to a shape substantially similar to the conductor in FIG. 5. For example, in some embodiments, a machine (not shown) can apply a force (e.g., bend, push, pull, other otherwise actuate)

to at least a portion of a conductor 64 to substantially form the turn portion 66 and the two leg portions 68 of a single conductor 64.

In some embodiments, at least some of the leg portions 68 can comprise multiple regions. In some embodiments, the leg portions 68 can comprise in-slot portions 74, angled portions 76, and connection portions 78. In some embodiments, as previously mentioned, the leg portions 68 can be disposed in the slots 56 and can axially extend from the insertion end 70 to the weld end 72. In some embodiments, after insertion, at least a portion of the leg portions 68 positioned within the slots 56 can comprise the in-slot portions 74.

In some embodiments, at least some of a regions of the leg portions 68 extending from stator core 48 at the weld end 72 can comprise the angled portions 76 and the connection portions 78. In some embodiments, after inserting the conductors 64 into the stator core 48, the leg portions 68 extending from the stator core 48 at the weld end 72 can undergo a twisting process (not shown) which can lead to the creation of the angled portions 76 and the connection portions 78. For example, in some embodiments, the twisting process can give rise to the angled portions 76 at a more axially inward position and the connection portions 78 at a more axially outward position. In some embodiments, after the twisting process, the connection portions 78 of at least a portion of the conductors 64 can be immediately adjacent to connection portions 78 of other conductors 64. As a result, the connection portions 78 can be coupled together to form one or more stator windings 50. In some embodiments, the connection portions 78 can be coupled via welding, brazing, soldering, melting, adhesives, or other coupling methods.

In some embodiments, the stator winding 50 can comprise a multi-phase stator winding. For example, in some embodiments, the stator winding 50 can comprise a three-phase stator winding 50 and each phase can be electrically coupled to a rectifier assembly 80 via terminals 82 and leads (not shown). In some embodiments, each phase of the stator winding 50 can be electrically coupled to a terminal 82. For example, as a result, during electric machine operations, when current flows through the field coil 44 and the rotor assembly 18 is rotating, a voltage can be generated in each of the phases of the stator winding 50 due to the magnetic field produced by the rotor assembly 18 and field coil 44. The voltage generated in each of the phases can lead an alternating current to circulate through the conductors 64 and to the rectifier assembly 80 via the terminals 82 and leads. In some embodiments, the rectifier assembly 80 can convert the alternating current produced to direct current for recharging any batteries (not shown) or other loads electrically connected to the module 10.

In some embodiments, the module 10 can comprise a plurality of machine cavities 14. In some embodiments, the stator assembly 20 and the rotor assembly 18 can be positioned within a first machine cavity 14a and the rectifier assembly 80 can be positioned within a second machine cavity 14b. For example, in some embodiments, the housing 12 can comprise a sleeve member 84 coupled to a first end cap 86 and a second end cap 88. In some embodiments, the sleeve member 84 can be coupled to the end caps 86, 88 via conventional fasteners 89 (e.g., screws, bolts, etc.) or via any other coupling techniques. In some embodiments, the sleeve member 84 can substantially circumscribe at least a portion of the stator assembly 20 and the end caps 86, 88 can be coupled to opposing axial sides of the sleeve member 84.

Figure 9A:
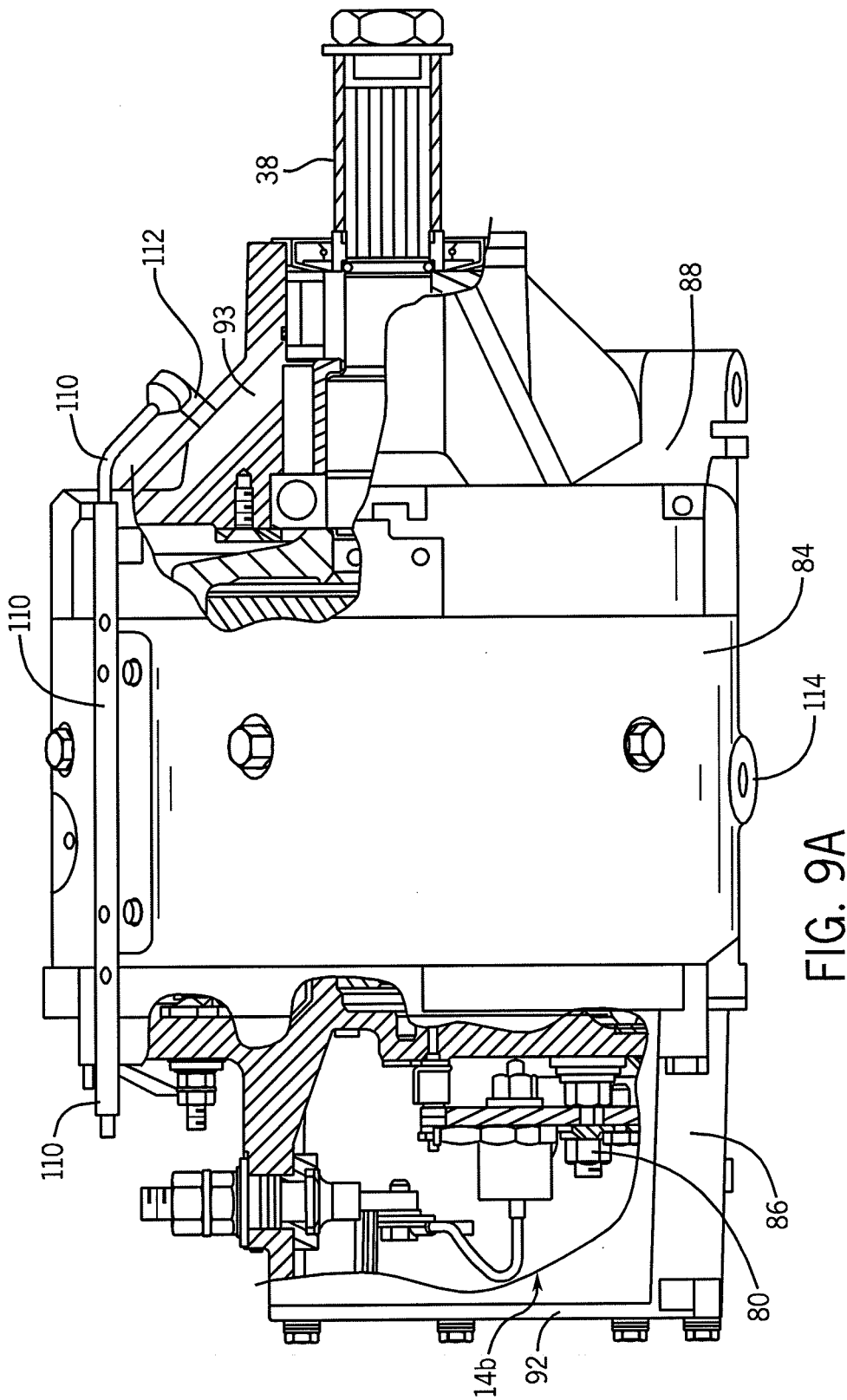
FIG. 9A is a side view of an electric machine module according to one embodiment of the invention.
Figure 9B:
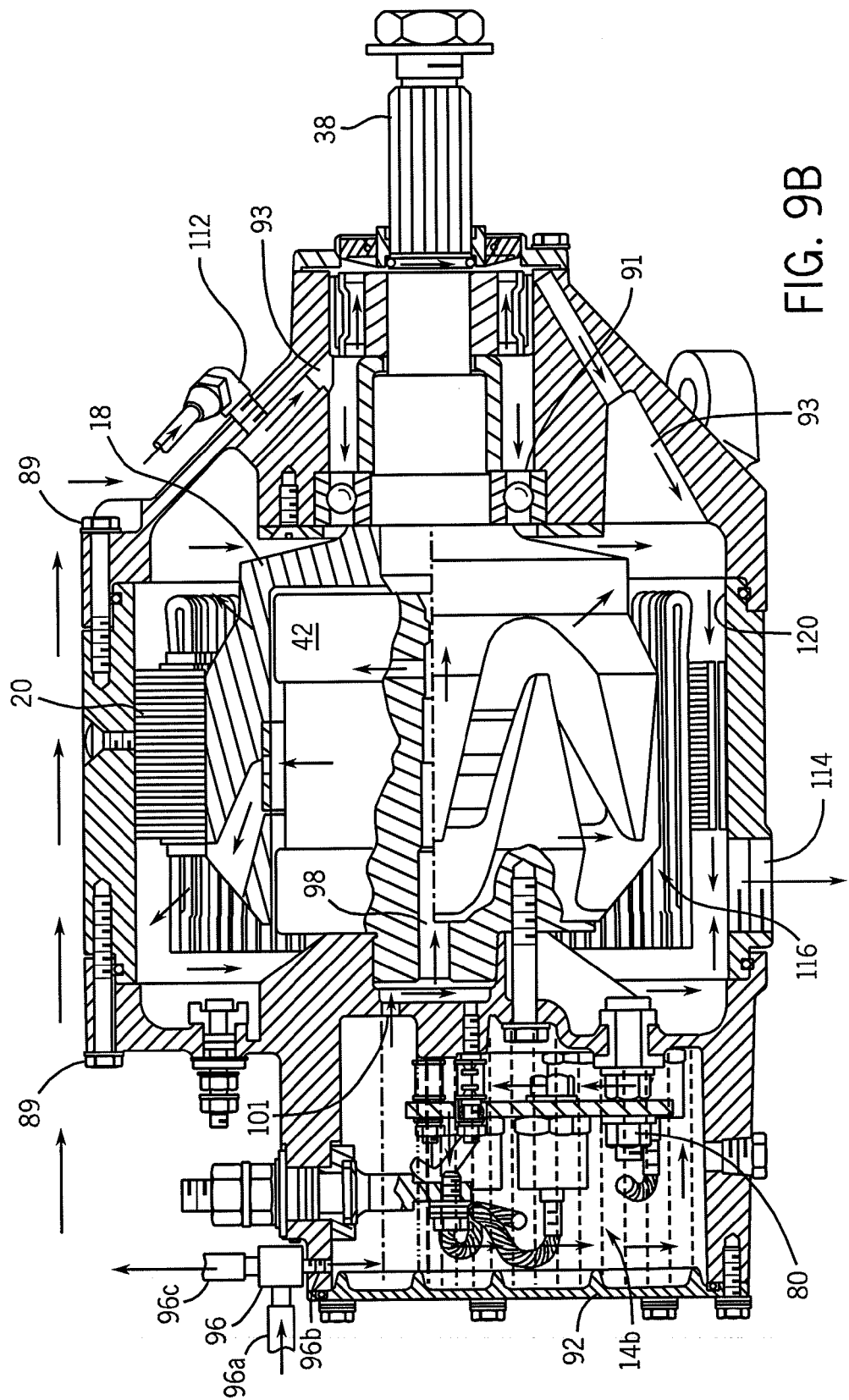
FIG. 9B is a side view of a partial cross section of an electric machine module according to one embodiment of the invention.

In some embodiments, at least one of the end caps 86, 88 can be configured and arranged to receive the rectifier assembly 80. For example, as shown in FIGS. 9A and 9B, in some embodiments, the rectifier assembly 80 can be positioned within a recess 90 at least partially defined by one of the end caps 86, 88. In some embodiments, electrical connections can extend through walls of one of the end caps 86, 88 to electrically couple the rectifier assembly 80 with the stator assembly 20 and current-requiring loads outside of the module 10. Additionally, in some embodiments, a third end cap 92 can be coupled to the housing 12 to substantially seal the recess 90 to provide at least physical insulation for the rectifier assembly 80 and to at least partially define the second machine cavity 14b.

In some embodiments, at least one of the end caps 86, 88 opposite the rectifier assembly 80 can comprise an alternative configuration. For example, in some embodiments, the first end cap 86 can comprise the rectifier assembly 80 and can generally include a configuration substantially similar to some previously mentioned embodiments, and the second end cap 88 can comprise an different configuration or vice versa. Although the description details the second end cap 88 comprising a configuration different from the first end cap 86, either end cap 86, 88 can comprise either configuration. Moreover, in some embodiments, the end caps 86, 88 can comprise a substantially similar configuration (not shown). In some embodiments, the second end cap 88 can be configured to receive and support at least a portion of the shaft 38. For example, as shown in FIGS. 9A and 9B, the shaft 38 can axially extend through at least a portion of the second end cap 88 and can be at least partially supported by a bearing assembly 91. Moreover, as discussed in further detail below, in some embodiments, the second end cap 88 can comprise at least a plurality of passages 93 configured and arranged to guide at least a portion of a coolant through regions of the second end cap 88 and other portions of the module 10.

In some embodiments, the module 10 can comprise a cooling system 94. In some embodiments, the cooling system 94 can comprise an inlet 96 positioned through a portion of the housing 12. In some embodiments, the cooling system 94 can comprise a plurality of inlets 96. For example, in some embodiments, the inlet 96 can be positioned substantially adjacent to the rectifier assembly 80 and can be in fluid communication with a coolant source (not shown). Also, in some embodiments, the inlet 96 can be in fluid communication with at least one of the machine cavities 14a, 14b. For example, in some embodiments, the inlet 96 can fluidly couple the coolant source to the second machine cavity 14b so that a coolant can enter the second machine cavity 14b, which can at least partially enhance electric machine cooling.

In some embodiments, the coolant can comprise transmission fluid, ethylene glycol, an ethylene glycol/water mixture, water, oil, motor oil, a mist, a gas, or another substance capable of receiving heat energy produced by the electric machine module 10. Also, in some embodiments, the coolant source can at least partially pressurize the coolant prior to or as it is being dispersed into the second machine cavity 14b via the inlet 96.

In some embodiments, the coolant can at least partially accumulate within the second machine cavity 14b. For example, in some embodiments, a volume of coolant can enter the second machine cavity 14b, and, because the second machine cavity 14b is substantially sealed, as previously mentioned, at least a portion of the coolant can remain within the second machine cavity 14b, as shown in FIG. 9B. As a result, in some embodiments, the coolant can receive at least a portion of the heat energy produced by the rectifier assembly 80, which can lead to at least partial cooling of the electric machine module 10.

In some embodiments, the cooling system 94 can comprise a first channel 98. In some embodiments, the cooling system 94 can comprise a plurality of first channels 98. In some embodiments, the first channel 98 can be at least partially positioned within the support member 42. For example, in some embodiments, the first channel 98 can be oriented in a substantially axial direction (e.g., substantially parallel to a central axis of rotation of the electric machine 16). In some embodiments, the support member 42 can be formed (e.g., cast, molded, etc.) so that the first channel 98 is substantially integral with the support member 42. Additionally, in other embodiments, the first channel 98 can be machined into the support member 42 at a point after support member 42 manufacture. In some embodiments, the first channel 98 can comprise an open end 100 and a substantially sealed end 102 as shown on F16.2. As a result, a fluid can enter the first channel 98 at the open end 100 and can flow toward the sealed end 102, but cannot exit the first channel 98 at the sealed end 102. However, in some embodiments, the first channel 98 can comprise two open ends 100 so that the fluid can readily flow through the first channel 98. Moreover, in some embodiments, the first channel 98 can comprise a substantially cylindrical shape, although in other embodiments, the first channel 98 can comprise other shapes (e.g., square, rectangular, regular or irregular polygonal, etc.).

In some embodiments, first channel 98 can be in fluid communication with at least one of the machine cavities 14a, 14b. For example, in some embodiments, a wall 104 of the housing 12, at least a portion of which is positioned between the machine cavities 14a, 14b, can be configured and arranged so that the first channel 98 can be in fluid communication with the second machine cavity 14b. In some embodiments, the support member 42 can be positioned so that the open end 100 of the first channel 98 is immediately adjacent to the wall 104. As a result, in some embodiments, at least a portion of the coolant that enters the second machine cavity 14b can enter the first channel 98 via the open end 100. For example, in some embodiments, the wall 104 can comprise at least one aperture 101 that can be configured and arranged to fluidly connect the second machine cavity 14b and the open end 100 of the first channel 98 so that at least a portion of the coolant can enter the first channel 98. In some embodiments, more than one aperture 101 can be disposed through the wall 104 to fluidly couple the second machine cavity 14b and the first channel 98.

Additionally, in some embodiments, the connection of the first channel 98 and the second machine cavity 14b can be configured and arranged to enhance cooling of the module 10 components in the second machine cavity 14b. In some embodiments, the aperture 101 through the wall 104 can be positioned a pre-determined distance from a bottom portion of the second machine cavity 14b. For example, in some embodiments, the aperture 101 can be positioned a great enough distance from the bottom portion of the second machine cavity 14b so that the coolant can accumulate within a significant portion of the second machine cavity 14b (e.g., the coolant can substantially flood the second machine cavity 14b), which can result in at least partially enhanced cooling of the module 10.

As shown in FIG. 2, in some embodiments, the cooling system 94 can comprise at least one second channel 106. For example, in some embodiments, the support member 42 can comprise the second channel 106, although in some embodiments, the support member 42 can comprise more than one second channel 106, as shown in FIG. 2. In some embodiments, the second channel 106 can be substantially radially oriented through at least a portion of the support member 42.

In some embodiments, similar to the first channel 98, the second channel 106 can be formed either substantially at the same time as formation of the support member 42 (e.g., casting, molding, etc.) or can be later machined into the support member 42.

Additionally, in some embodiments comprising multiple second channels 106, in some embodiments, one of the second channels 106 can be positioned substantially adjacent to the open end 100 and another second channel 106 can be positioned substantially adjacent to the closed end 102. In some embodiments, as described in further detail below, at least a portion of the second channels 106 can comprise different dimensions (e.g., diameter, circumference, perimeter, etc.). Moreover, in some embodiments, at least some of the second channels 106 can comprise a substantially cylindrical shape, although in other embodiments, the second channels 106 can comprise other shapes (e.g., square, rectangular, regular or irregular polygonal, etc.).

In some embodiments, at least a portion of the second channels 106 can fluidly connect the first channel 98 with the first machine cavity 14a. For example, in some embodiments, the second channels 106 can be configured and arranged to direct at least a portion of the coolant that enters the first channel 98 into the machine cavity 14a so that at least some of the coolant can contact portions of the module 10 to aid in cooling.

In some embodiments, because the support member 42 remains substantially stationary during operation of the module 10, the second channels 106 can be arranged to at least partially enhance coolant dispersal. For example, in some embodiments, at least a portion of the second channels 106 can extend from the first channel 98 in a radially downward direction and some of the second channels 106 can extend from the first channel 98 in a radially upward direction. As a result, although the support member 42 does not rotate to aid in dispersing coolant to the first machine cavity 14a, by including second channels 106 arranged to disperse coolant in a plurality of different radial directions, the coolant can be more evenly dispersed throughout the first machine cavity 14a relative to embodiments where coolant is dispersed in fewer directions.

Moreover, in some embodiments, as previously mentioned, at least a portion of the second channels 106 can comprise different configurations. In some embodiments, the different configurations of the second channels 106 can at least partially aid in directing coolant flow. As previously mentioned, the second channels 106 can comprise a variety of different configurations, and, although some later references may be to configurations that indicate substantially cylindrical second channels 106 (e.g., circumference, diameter, etc.), those references are in no way intended to limit the configuration of the channels 106 to a substantially cylindrical configuration. In some embodiments, at least one of the second channels 106 can comprise a greater diameter than another second channel 106. For example, in some embodiments, the second channel 106 that is positioned substantially adjacent to the open end 100 of the first channel 98 can comprise a lesser diameter compared to the second channel 106 substantially adjacent to the closed end 102. In some embodiments, coolant flow through the second channel 106 substantially adjacent to the open end 100 can be at least partially restricted. As a result, in some embodiments, at least a portion of the coolant entering the first channel 98 will be directed toward the second channel 106 adjacent to the closed end 102, which can lead to more even cooling (e.g., coolant can exit the first channel 98 through multiple second channels 106) of the module 10. Furthermore, in some embodiments, the pressure created by the coolant source can at least partially urge, direct, and/or drive at least a portion of the coolant through the cooling system 94.

In some embodiments, the rotor assembly 18 can aid in dispersing at least a portion of the coolant throughout the first machine cavity 14a, as reflected by some of the arrows in FIG. 9B. In some embodiments, at least a portion of the second channels 106 can comprise coolant outlets 108 positioned at radially outermost regions of the second channels 106. Moreover, in some embodiments, at least a portion of the coolant outlets 108 can be positioned substantially immediately radially inward from portions of the rotor assembly 18. Accordingly, in some embodiments, if the rotor assembly 18 is moving during module 10 operations and coolant exits the outlets 108, the movement of the rotor assembly 18 can lead to at least a portion of the cooling being dispersed throughout the first machine cavity 14a (e.g., via "splashing" due to rotor assembly 18 movement), as reflected by some of the arrows in FIG. 9B. In some embodiments, portions of the coolant can contact various module 10 elements including, but not limited to the housing 12, the stator assembly 20, the stator winding 50, the shaft 38, and other elements, which can lead to at least partial cooling and lubrication of module 10 components. Moreover, in some embodiments comprising at least some scallops 60, cooling can be at least partially enhanced. For example, as previously mentioned, the scallops 60 can at least partially increase surface area on the outer diameter of the stator core 48. As a result of the increase surface area, more coolant can contact at least a portion of the stator core 48, which can lead to at least partially enhanced cooling.

In some embodiments, the cooling system 94 can comprise at least one third channel 110. In some embodiments, the inlet 96 can be configured and arranged to divide at least a portion of the coolant from the coolant source into at least two different directions. In some embodiments, the inlet 96 can comprise a "tee" configuration so that at least a portion of the coolant can enter the second machine cavity 14b, as previously mentioned, and another portion of the coolant can be directed to the third channel 110, as shown in FIGS. 10A and 10B.

Figure 10B:
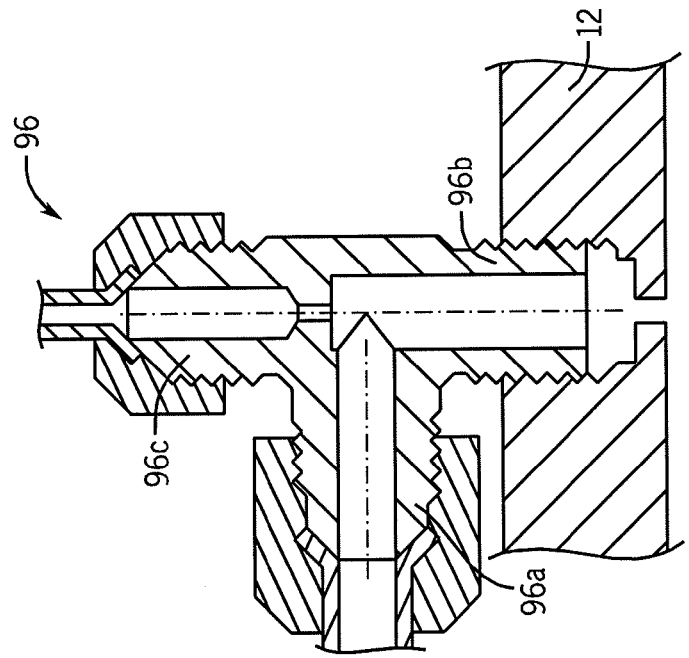
FIG. 10B is a cross-sectional view of a portion of the module of FIG. 10A along line A-A.
Figure 10A:
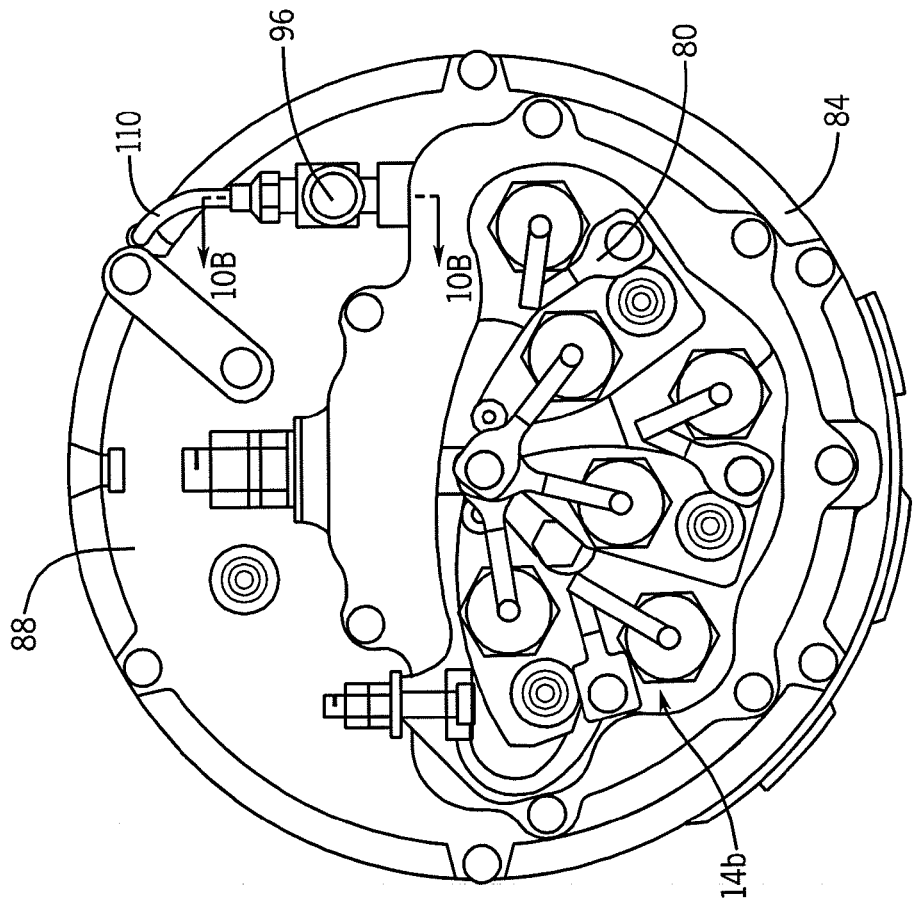
FIG. 10A is a rear view of an electric machine module according to one embodiment of the invention.

For example, as shown in FIG. 10B, in some embodiments, the inlet 96 can comprise a inlet aperture 96a and at least two outlet apertures 96b, 96c. In some embodiments, at least one of the outlet apertures 96b, 96c can fluidly couple the inlet aperture 96a and the second machine cavity 14b. In some embodiments, at least one of the outlet apertures 96b, 96c can fluidly couple the inlet aperture 96a and the third channel 110. As a result, in some embodiments, as coolant enters the inlet 96 via the inlet aperture 96a, at least a portion of the coolant can enter the third channel 110 via at least one of the outlet apertures 96b, 96c and another portion of the coolant can enter the second machine cavity 14b via another of the outlet apertures 96b, 96c.

In some embodiments, at least a portion of the third channel 110 can be substantially exterior to the housing 12. For example, as shown in FIG. 9A, in some embodiments, at least a portion of the third channel 110 can be coupled to an exterior portion of the housing 12 so that a portion of the coolant can be transported to a portion of the housing 12 that is substantially axially opposite to the second machine cavity 14b (e.g., the second end cap 88). In some embodiments, the third channel 110 can be in fluid communication with a second inlet 112, which can be in fluid communication with the first machine cavity 14a and the passages 93 defined in the second end cap 88. For example, in some embodiments, at least a portion of the coolant can flow through the passages 93 and can contact portions of the end cap 88, the shaft 38, the bearing assembly 91, and other portions of the module 10. Moreover, as shown in FIG. 9B, in some embodiments at least a portion of the passages 93 can fluidly connect the second inlet 112 and the first machine cavity 14a so that at least a portion of the coolant that enters the passages 93 via the second inlet 112 can eventually enter the first machine cavity 14a. As a result, in some embodiments, coolant can be more evenly distributed to the machine cavities 14a, 14b and various elements of the module 10.

Figure 11A:
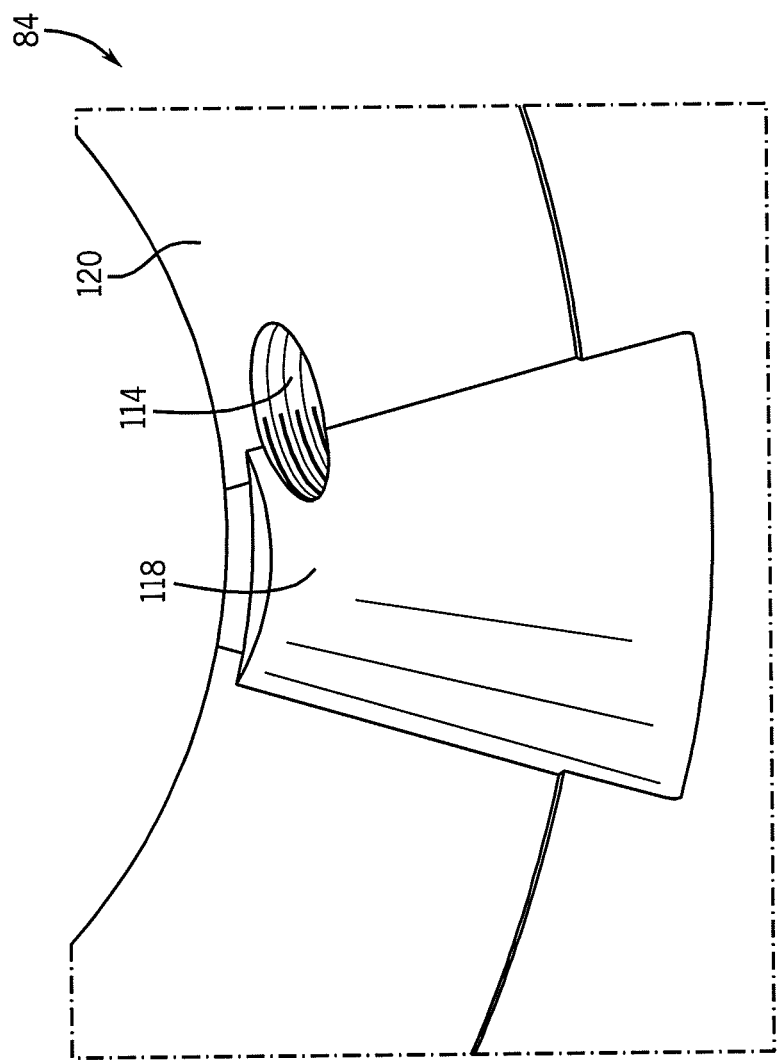
FIG. 11A is a perspective view of a portion of an inner wall of a sleeve member according to one embodiment of the invention.
Figure 11B:
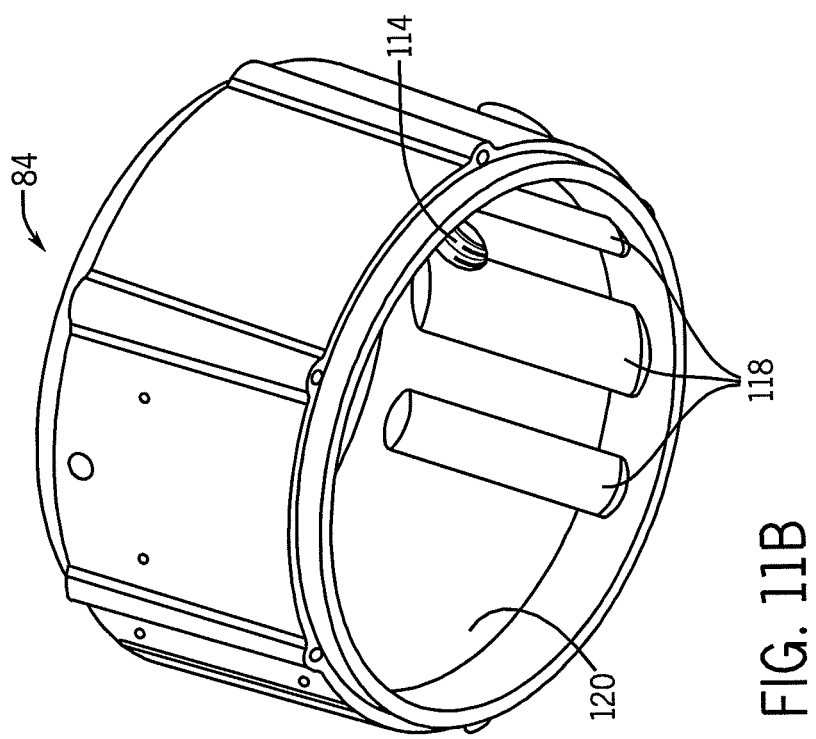
FIG. 11B is a perspective view of a sleeve member according to one embodiments of the invention.

In some embodiments, after entering the first machine cavity 14a, at least a portion of the coolant can contact various elements of the module 10 and can then drain from the module 10. In some embodiments, the housing 12 can comprise at least one drain aperture 114 that can be in fluid communication with at least one of the first machine cavity 14a and the second machine cavity 14b. For example, in some embodiments, the drain aperture 114 can be positioned in a substantially lower portion of the housing 12, so that, after entering the first machine cavity 14a, at least a portion of the coolant can drain generally downward (e.g., via gravity and/or pressure) and can exit the machine cavity 14a so as not to accumulate in the first machine cavity 14a. In some embodiments, the drain aperture 114 can be in fluid communication with a heat exchange element (e.g., a radiator, a heat exchanger, etc.) (not shown) so at least a portion of the coolant can flow from the drain aperture 114 to the heat exchange element where at least a portion of the heat energy received by the coolant can be removed. In some embodiments, the drain aperture 114 can comprise threading, as shown in FIG. 11. In some embodiments, the threading can at least partially enable coupling between the drain aperture 114 and the heat exchange element. In other embodiments, the drain aperture 114 and the heat exchange element can be coupled in other manners (e.g., interference fit, adhesives, conventional fasteners, etc.) In some embodiments, the heat exchange element can be fluidly connected to the coolant source or can comprise the coolant source so that the coolant can be recycled for further use in module 10 cooling.

In some embodiments, the module 10 can comprise enhanced drainage capability. In some embodiments, in order to at least partially enhance cooling of the module 10, a greater volume of coolant can be circulated through portions of the module 10, as previously mentioned. In some embodiments, more heat energy can be conducted away from the module 10, which can at least partially enhance module 10 operations. As a result, in some embodiments, the module 10 can comprise greater drainage capability to account for an increased volume of coolant. For example, if too great a volume of coolant accumulates within portions of the first machine cavity 14a, an air gap 116 defined between the rotor assembly 18 and the stator assembly 20 can become at least partially flooded, which can negatively impact machine 16 operations. For example, by at least partially flooding the first machine cavity 14a, excess heat can accumulate within the module because of coolant shear associated with an at least partially flooded air gap 116.

In some embodiments, the module 10 can comprise at least one drain guide 118. In some embodiments, the housing 12 can comprise the drain guide 118 positioned substantially adjacent to the drain aperture 114. For example, in some embodiments, the sleeve member 84 can comprise an inner wall 120 that at least partially defines a portion of the first machine cavity 14a and the inner wall 120 can comprise at least a portion of the drain guide 118, as shown in FIG. 11. In some embodiments, the drain guide 118 can be positioned after manufacture of the sleeve member 84 (e.g., the drain guide 118 can be machined into the sleeve member 84). In some embodiments, the sleeve member 84 can be formed so that the drain guide 118 is substantially integral at the time of sleeve member 84 manufacture (e.g., the sleeve member 84 can be cast, molded, or otherwise formed with the drain guide 118 being formed at substantially the same time). Moreover, in some embodiment, the sleeve member 84 can comprise multiple drain guides 118 (e.g., three drain guides) and at least a portion of the guides 118 can be formed after sleeve member 84 manufacture and at least a portion of the guides 118 can be formed at substantially the same time as sleeve member 84 manufacture. Although, in some embodiments, the drain guides 118 can be manufactured at substantially the same time and in substantially the same manner.

In some embodiments, the drain guides 118 can comprise multiple configurations. For example, as shown in FIG. 11, in some embodiments, at least a portion of the drain guides 118 can comprise a substantially semi-circular and/or curved configuration (e.g., a substantially "u-shaped" configuration). In some embodiments, at least a portion of the drain guides 118 can comprise an angled configuration (e.g., a substantially "v-shaped" configuration). In some embodiments, at least a portion of the drain guides 118 can comprise other shapes and configurations that can at least partially enable a portion of coolant to flow toward the drain aperture 114 (e.g., a structure extending radially inward from the inner wall 120 or other recessed structures).

Figure 12:
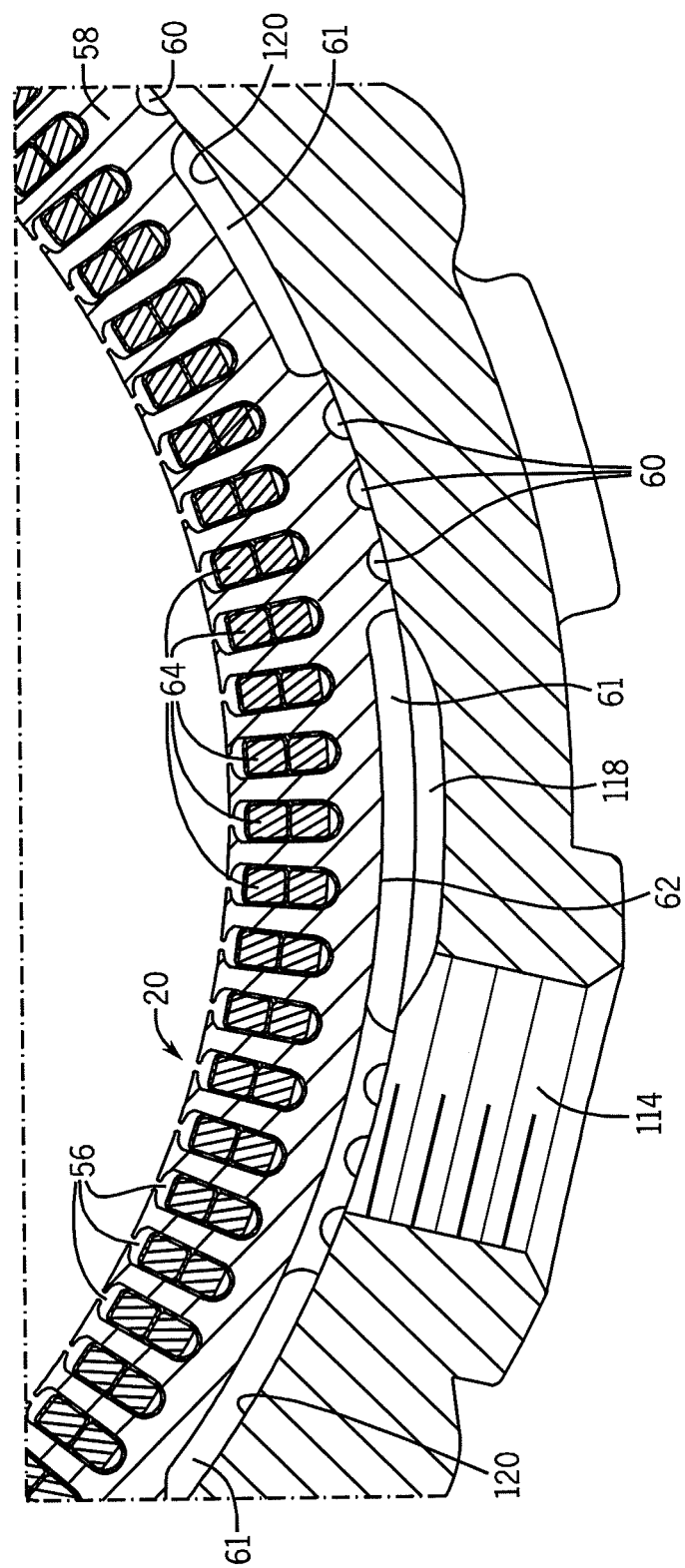
FIG. 12 is a partial cross-sectional view of a sleeve member and stator assembly according to one embodiment of the invention.
Figure 13:
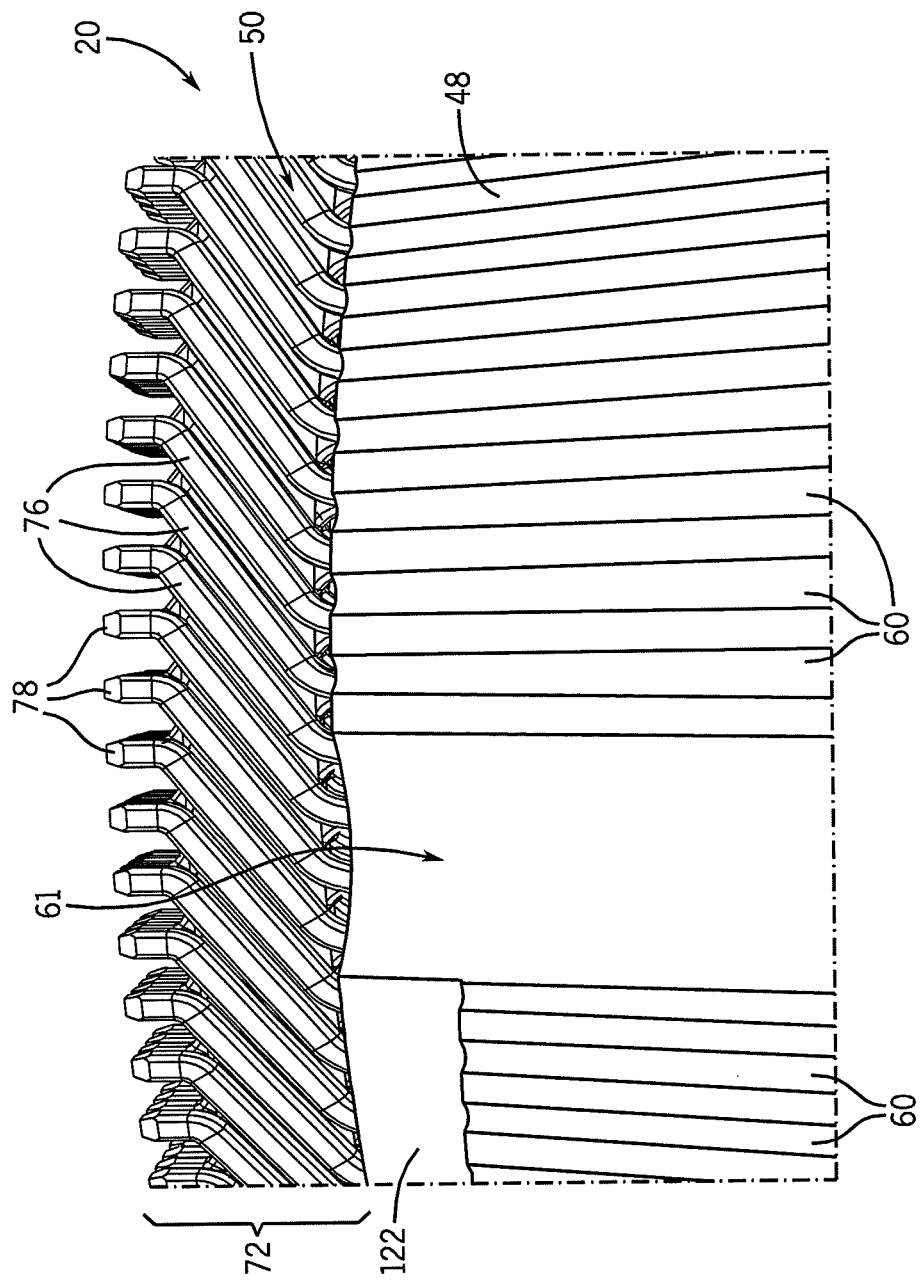
FIG. 13 is a perspective view of a portion of a stator assembly according to one embodiment of the invention.

In some embodiments, at least a portion of the drain guides 118 can be configured and arranged to guide at least a portion of the coolant toward the drain aperture 114. As shown in FIGS. 11 and 12, in some embodiments, the drain aperture 114 can be in fluid communication with at least one of the drain guides 118. For example, as shown in FIGS. 11 and 12, in some embodiments, at least one of the drain guides 118 can be positioned on the sleeve member 84 so that at least a portion of the drain aperture 114 substantially overlaps with a portion of at least one of the drain guides 118. For example, in some embodiments, the drain aperture 114 can be disposed through a portion of the sleeve member 84 so at least a portion of the drain apertures 114 is substantially contiguous with at least one of the guides 118 or vice versa.

In some embodiments, the stator assembly 20 can be coupled to the sleeve member 84 to at least partially enable drainage of coolant through the drain aperture 114. For example, in some embodiments, the sleeve member 84 can be coupled to the sleeve member 84 so that at least a portion of the recesses 61 are substantially adjacent to the drain aperture 114 and/or at least a portion of the drain guides 118. As shown in FIG. 12, in some embodiments, at least one of the recesses 61 can be substantially radially inward from at least one of the drain guides 118 and/or the drain aperture 114 so that coolant can readily flow in a space defined between the outer diameter of the stator assembly 20 and the sleeve member 84 (e.g., portions of the drain guides 118 and/or the inner wall 120).

Moreover, in some embodiments, as previously mentioned, the sleeve member 84 can comprise more than one drain guide 118 and the stator assembly 20 can comprise more than one recess 61. Accordingly, in some embodiments, the stator assembly 20 can be coupled to the sleeve member 84 so that at least a portion of the recesses 61 substantially align with at least a portion of the drain guides 118. As a result, in some embodiments, at least a portion of the coolant can flow from the coolant system 94 and more readily flow through the spaces defined between the drain guides 118 and the recesses 61 relative to some embodiments not including the drain guides 118 because of the increased size of the space between the stator assembly 20 and the sleeve member 84.

Although the following example demonstrates the potential impact of the drain guides 118 on draining coolant from the module 10, these results are included for exemplary purposes only and in no way limit the scope of this disclosure. By way of example only, in some embodiments, greater numbers of drain guides 118 can at least partially lead to enhanced coolant drainage. For example, when comparing comparable modules 10 that include one drain guide 118 versus three drain guides 118, the module 10 including three drain guides 118 is able to drain coolant at a greater rate, and as a result, included lower levels of coolant in the machine cavity 14a. For example, when circulating approximately 1.3 gallons per minute of coolant through the module 10, modules 10 including three drain guides 118 exhibited an approximately 50% lesser level of coolant within the machine cavity 14a relative to modules 10 including a single drain guides 118 when the rotor assembly 18 was rotating at approximately 1600 RPM. Additionally, at a greater flow rate of coolant (e.g., 1.4 gallons per minute), modules 10 including three drain guides 118 still exhibit an approximately 50% lesser level of coolant relative to modules 10 including one drain guide 118. Moreover, at higher rotor assembly 18 velocities (e.g., 6500 RPM), regardless of coolant flow rate (e.g., 1.3 gallons per minute or 1.4 gallons per minute), modules 10 including three drain guides 118 continue to exhibit an approximately 25% lesser level of coolant relative to modules 10 including a single drain guide 118. As a result, the greater the number of drain guides 118, the greater capability the module 10 can comprise for draining coolant through the module 10.

In some embodiments, the stator core 48 be configured and arranged to at least partially enhance coolant drainage. In some embodiments, an outer diameter of a region 122 of the stator core 48 substantially adjacent to the drainage aperture 114 can be at least partially reduced so that the outer diameter of the region 122 is substantially similar to the outer diameter of portions of the stator core 48 comprising the recesses 61. For example, in some embodiments, the region 122 can further increase the area defined between the stator core 48 and the inner wall 120 in a position substantially adjacent to the drain aperture 114 so that coolant can more easily flow to the drain aperture 114 relative to embodiments without the region 122 with a reduced outer diameter. In some embodiments, the region 122 can be formed by machining after assembly of the core 48, although in other embodiments, the core 48 can comprise laminations 52 configured and arranged to define the region 122.

In some embodiments, at least some of the cooling configurations can be more efficient than cooling configurations found in some conventional electric machines. Some conventional machines can be cooled by air flow. Because many electric machines, such as alternators, generators, and electric motors can be installed in portions of some vehicles (e.g., an engine of a bus, car, or other method of transportation) and can be substantially air-cooled, at least some conventional electric machines can operate at less than optimal levels. For example, during operation of an engine, the ambient temperature around an electric machine can be around 125 degrees Celsius, which means that to cool the machine, 125 degree air will be drawn into the housing for cooling. For some conventional electric machines, this 125 degree air can offer minimal cooling during operations, which can negatively impact machine performance and output. In some embodiments of the invention, by circulating a coolant through the module 10, the operating temperature of the electric machine 16 can be at least partially reduced because the coolant can produce convection coefficients on the various surfaces that the coolant contacts that can be at least an order of magnitude greater than some conventional, air-cooled electric machines. Moreover, in some embodiments, because the temperature of the coolant can be at least partially controlled by a heat exchange element, as previously mentioned, the coolant can enter the module 10 at a lesser temperature relative air from an operating engine (e.g., 110 degrees Celsius v. 125 degrees Celsius), which can improve cooling.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
a housing including a sleeve member coupled to at least one end cap, the housing defining a machine cavity;
an electric machine positioned within the machine cavity and at least partially enclosed by the housing, the electric machine comprising a brushless configuration, a central axis of rotation, a stationary support member coupled to a wall of the housing and extending into the machine cavity, and a stator assembly comprising a plurality of laminations and substantially circumscribing at least a portion of a rotor assembly,
the stator assembly including at least one recess positioned at the outer diameter of at least one of the plurality of laminations;
a cooling system at least partially positioned within portions of the housing and support member, the cooling system including
a first inlet disposed through a portion of the housing,
a first channel at least partially disposed within the support member and oriented substantially parallel to the central axis of rotation, the first channel being in fluid communication with the at least one inlet, and
at least one second channel disposed within the support member and oriented substantially perpendicular to the central axis of rotation, the at least one second channel being in fluid communication with the first channel and the machine cavity; and
a drain aperture disposed through at least a portion of the housing, the drain aperture in fluid communication with the machine cavity; and
wherein the housing comprises at least one drain guide substantially immediately adjacent to the drain aperture and adjacent to the at least one recess, the at least one recess positioned substantially radially inward from the at least one drain guide.

2. The electric machine module of claim 1, wherein the housing comprises three drain guides.

3. The electric machine module of claim 1, wherein the housing comprises a first machine cavity and a second machine cavity.

4. The electric machine module of claim 3, wherein the first inlet and the first channel are in fluid communication with at least the second machine cavity.

5. The electric machine module of claim 3, wherein a rectifier assembly is electrically connected to the stator assembly and at least partially positioned within the second machine cavity.

6. The electric machine module of claim 1, wherein the cooling system comprises a plurality of second channels.

7. The electric machine module of claim 1 and further comprising a third channel coupled to a portion of the housing and a second inlet disposed through a portion of the housing, and wherein the third channel fluidly couples the first inlet and the second inlet.

8. The electric machine module of claim 7, wherein the housing comprises a sleeve member coupled to a first end cap and a second end cap, and wherein the first inlet is disposed through a portion of the first end cap and the second inlet is disposed through a portion of the second end cap.

9. The electric machine module of claim 1, wherein the at least one of the plurality of laminations includes a plurality of scallops.

10. An electric machine module comprising:
a housing defining a first machine cavity and a second machine cavity, the housing including at least one drain aperture and at least one drain guide;
an electric machine positioned within the first machine cavity and at least partially enclosed by the housing, the electric machine comprising a brushless configuration, a central axis of rotation, and
a stationary support member coupled to a wall of the housing and extending into the first machine cavity,
a field coil wound around at least a portion of the stationary support member,
a rotor assembly substantially circumscribing at least a portion of the support member and the field coil, the rotor assembly including two Lundell-type segments coupled together, and
a stator assembly including an insertion end, a weld end, and
a stator core comprising a plurality of laminations, a plurality of axially oriented slots and a plurality of scallops disposed around a substantial portion of an outer diameter of the stator core, the plurality of laminations including at least one recess positioned at the outer diameter of at least one of the plurality of laminations, and
wherein the electric machine is positioned within the first machine cavity so that the at least one recess is substantially radially inward from and substantially immediately adjacent to the at least one drain guide,
a stator winding at least partially positioned within the plurality of slots, the stator winding including a distributed winding configuration and comprising a plurality of conductors positioned in the slots, each of the conductors including a turn portion extending between at least two leg portions, the two leg portions including angled portions and connection portions, wherein at least some of the turn portions of the plurality conductors are positioned on the insertion side and at least some of the angled portions and connection portions are positioned on the weld side; and
a cooling system at least partially positioned within portions of the housing and support member.

11. The electric machine module of claim 10, wherein the module comprises an alternator.

12. The electric machine module of claim 10, wherein the cooling system comprises a first inlet disposed through a portion of the housing; a first channel at least partially disposed within the support member and oriented substantially parallel to the central axis of rotation, the first channel being in fluid communication with the at least one inlet; and at least one second channel disposed within the support member and oriented substantially perpendicular to the central axis of rotation, the at least one second channel being in fluid communication with the first channel and the first machine cavity.

13. The electric machine module of claim 12, and further comprising a third channel fluidly connected to the first inlet and being in fluid communication with the first machine cavity.

14. The electric machine module of claim 10, wherein the cooling system comprises a plurality of second channels.

15. The electric machine module of claim 10, wherein the housing comprises a sleeve member coupled to a first end cap and a second end cap; and wherein the sleeve member comprises the at least one drain aperture and the at least one guide.

16. The electric machine module of claim 10, wherein the plurality of conductors comprises a hairpin configuration.

17. A method for assembling an electric machine module, the method comprising:
    providing a housing defining a machine cavity, the housing includes a sleeve member coupled to a first end cap and a second end cap;
    positioning an electric machine within the machine cavity so that the electric machine is at least partially enclosed by the housing, the electric machine comprising a brushless configuration, a central axis of rotation, and including a stator assembly comprising a plurality of laminations, and a plurality of scallops,
    the plurality of laminations including at least one recess positioned at the outer diameter of at least one of the plurality of laminations; and
    coupling a stationary support member to a wall of the housing and so that the support member extends into the machine cavity;
    disposing a first inlet through a portion of the first end cap;
    disposing a second inlet through a portion of the second end cap;
    positioning a first channel within the support member and oriented substantially parallel to the central axis of rotation so that the first channel is in fluid communication with the first inlet;
    disposing at least one second channel within the support member and oriented substantially perpendicular to the central axis of rotation, the at least one second channel is in fluid communication with the first channel and the machine cavity;
    coupling at least one third channel to a portion of the housing so that the third channel fluidly connects the first inlet and the second inlet;
    disposing at least one drain guide along an inner wall of the sleeve member so that the at least one drain guide is substantially immediately adjacent to the at least one recess, the at least one recess positioned substantially radially inward from the at least one drain guide; and
    positioning at least one drain aperture through a portion of the sleeve member so that the at least one drain aperture is substantially immediately adjacent to the at least one drain guide.

18. The method of claim 17, wherein the inner wall of the sleeve member comprises three drain guides.

* * * * *